United States Patent Office 3,459,731
Patented Aug. 5, 1969

3,459,731
CYCLODEXTRIN POLYETHERS AND THEIR PRODUCTION
Robert E. Gramera, Hinsdale, and Ronald J. Caimi, Oak Forest, Ill., assignors to Corn Products Company, New York, N.Y., a corporation of Delaware
No Drawing. Filed Dec. 16, 1966, Ser. No. 602,145
Int. Cl. C08b 19/08
U.S. Cl. 260—209
14 Claims This invention relates to cyclodextrin derivatives, namely, polyether derivatives; and the invention also relates to methods of making such new polyether derivatives.

The cyclodextrins have been known in the art as cyclic compounds prepared from starches by enzymes elaborated by *Bacillus macerans*. The cyclodextrins are also known as Schardinger dextrins from an early investigator who studied these materials. These cycledextrins are homologous cyclic molecules containing 6 or more α-D glucopyranose units linked together at the 1,4 positions as in amylose. The cyclic molecule may also be referred to as a torus, and the cyclic molecule arrangement of this torus is characterized by having no reducing end groups. The torus molecule is depicted in the following schematic formula, where the anhydroglucose units are shown linked at the 1,4 positions, and the hydroxyls are shown at the 2,3 and 6 positions of the illustrated units.

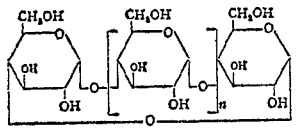

When $n$ is 4, the torus molecule illustrated is known as the α-cyclodextrin or cyclohexaamylose because the torus contains six anhydroglucose units. When $n$ is 5, the seven unit member is known as β-cyclodextrin or cycloheptaamylose; and when $n$ is 6, the eight unit member is known as γ-cyclodextrin or cyclooctamylose. When reference is made hereto the "torus molecule" or "cyclodextrins" it is intended that such terms include the foregoing forms as well as still other tori which have a still larger number of units in the molecule.

The cyclodextrins are known as clathrating compounds, that is, they are adapted to form inclusion compounds. They are known to form a variety of crystalline complexes with many organic substances, particularly with organic liquids of low solubility in water. They are also known to form various complexes with neutral salts, halogens, and bases. In referring to the inclusion and clathrating properties, reference is often made to the torus molecule being a host molecule and the included or complexed molecule being the guest molecule. The use of the cyclodextrins to form various inclusion compounds and the utility of such various inclusion compounds are well known. It is therefore evident that the cyclodextrins have established utility, and are the subject of study for further applications. It is understandably desirable to provide novel cyclodextrin structures to be used as various inclusion compounds. It is further desirable to provide such new cyclodextrin structures which may be used for purposes in addition to uses as clathrating compounds.

It is accordingly one primary object of this invention to provide new and useful cyclodextrin compounds. A related object of the invention is to provide new and practical processes for the production of these new compounds.

It is another important object of this invention to provide new and useful cyclodextrin compounds at different high molecular weights.

It is still another object to provide new and useful cyclodextrin compounds that can be used as intermediates for the preparation of other useful compositions of matter.

Still another object of this invention is to provide novel cyclodextrin compounds that possess desirable physical properties so that they can be usefully directed toward a variety of applications.

A further object of this invention is to provide a practical method for making novel cyclodextrin compounds of the character described, particularly a relatively simple and economical process for making the cyclodextrin derivatives so that they have the greater attraction when they are made the subject of commercial efforts.

Other objects of the invention will be apparent hereinafter from the specification and from the recitals of the appended claims.

In general, in the practice of one preferred embodiment of the present invention, the cyclodextrins are reacted with an alkylene oxide, preferably under superatmospheric pressure and at an elevated temperature, in the presence of an alkaline catalyst. The reaction is preferably conducted in an autoclave at pressures of up to about 60 p.s.i.g. or higher, and at temperatures of at least about 70° C. An amount of the alkylene oxide is added that is sufficient to accomplish the desired amount of addition to the anhydroglucose units in the torus molecule, that is, the cyclodextrin. The reaction is continued until the desired amount of alkylene oxide addition to cyclodextrin has occurred. One way in which this can be determined is to note the point when the pressure is reduced in the autoclave. Following the reaction, the catalyst optionally may be neutralized, as by an acid addition, the polyether product may then be recovered.

The alkylene oxides that can be used in the reaction with cyclodextrin includes the lower alkylene oxides such as, for example, ethylene oxide, propylene oxide, butylene oxide, amylene oxide, glycidol (hydroxypropylene oxide), butadiene oxide, styrene oxide and the like.

The cyclodextrin polyether products of this invention may be represented by the following general formula:

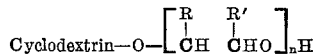

wherein $n$ represents the molar substitution hereinafter defined.

As is known, the anhydroglucose unit, of the type which is present in cyclic form in the cyclodextrin, may have various degrees of substitution (D.S.) of from a small but detectable amount, less than one, to the maximum level of three. According to the present understanding in the art, the 6 position hydroxyl group in the anhydroglucose unit is the most reactive; the hydroxyl group at the 2 position is considered to be the next most reactive, and the hydroxyl group at the 3 position appears to be the least reactive. Moreover, the 6 position hydroxyl group usually will undergo a more extensive substitution or addition than the hydroxyls at the 2 and 3 positions, but it may be otherwise. Irrespective of the actual sequence or the number of anhydroglucose units involved, the general formula above is intended to represent the products of this invention wherein the ether substitution may occur may occur to various degrees of substitution at all or less than all anhydroglucose units in the cyclodextrin, and at one or more of the hydroxyl groups in a given anhydroglucose unit.

In the general formula R and R′ are different or the same, and can be hydrogen, lower alkyl radicals, lower alkyl halides, lower alkyl alcohols, lower alkylene or arylene. The lower alkyl may be up to about butyl, for example. The group within the bracket may be repeatedly added to obtain the polyether products of the invention.

Cyclodextrin is produced from starch by the action of an enzyme commonly known as cyclodextrin transglycosylase (*B. macerans* amylase). The source of the enzyme is usually a culture of *Bacillus macerans* which is grown under conventional conditions on conventional media containing sources of nitrogen, carbon, growth factors and minerals. The cyclodextrin transglycosylase may be produced by following published teachings such as, for example, those described by D. French in Methods in Enzymology, S. P. Colowick and N. O. Kaplan, editors, Academic Press, New York, N.Y., vol. V. 1962 pp. 148–155.

The cyclodextrin transglycosylase activity in cultures of *Bacillus macerans* may be measured by the Tilden-Hudson procedure as described by these two workers in J. Bacteriol., 43, 527–544, 1942. In general, the cyclodextrin transglycosylase is added to a dilute solution of a gelatinized starch, whereupon a conversion to the cyclodextrin occurs by enzymolysis. Procedures for making and isolating the cyclodextrins have been variously described as by F. Cramer and D. Steinle, Ann., 595, 81 (1955). If desired, the various homologs such as, for example, the alpha, beta, and gamma may be fractionated by procedures such as those described by D. French, et al., J. Am, Chem. Soc., 71, 353 (1949). The various homologous cyclodextrins, having from six to eight units, or higher, and their mixtures, may be used as equivalent starting materials to prepare the new polyether compounds of this invention. In practice, there may be little reason for separating the various fractions, and starting materials may be conveniently employed which constitute a preponderance of β-cyclodextrin, for example. As stated, no distinction is intended between the various cyclodextrins or their mixtures unless otherwise indicated, when using the term "cyclodextrin."

The cyclodextrin is reacted with the alkylene oxide in an inert solvent in which the water-insoluble cyclodextrin may be dispersed. Various alkylene oxides may be used as previously described but it is preferred to employ the ethylene or propylene oxides. Generally, the alkylene oxide may be used as a reactive solvent. Other suitable solvents include such different organic solvents as xylene, toluene, benzene, dioxane, and the like.

The method, by which the reaction of the present invention is conducted, utilizes alkaline catalysis. Potassium hydroxide is an efficient catalyst which can be used, but other basic hydroxides may be used such as, for example, sodium hydroxide or calcium hydroxide. Basic amine catalysts could also be used as well as other alkaline catalysts. In general, about 1% to about 7% of the catalyst by weight of the reactants is used.

Elevated temperatures and pressures are employed. Accordingly, the temperatures employed are preferably in excess of about 50° C. and may be extended to above about 200° C., and for practical purposes will seldom exceed 250° C. When using ethylene oxide as the ethyifying agent, somewhat lower temperatures may be used, as compared to the higher alkylene oxides. The pressures which are used with these temperatures should be at least about 25 p.s.i.g., and may be extended to higher levels of about 50 p.s.i.g., or higher if desired.

Various other steps may be practiced in the process to facilitate the collection and separation of the cyclodextrin polyether product. This may include neutralizing the basic catalyst and stripping the volatiles under reduced pressure before or after filtration. Tartaric acid is often used to neutralize alkaline materials in products which can be filtered. Tartaric acid is particularly used where a low ash content is desired in the filtered product, whereas mineral acids may be used where a higher ash content can be tolerated.

In many instances it is desirable, although not necessary, to remove the glycol polyether by products which may occur. These lower molecular weight materials generally have a higher hydroxyl number than the higher molecular weight cyclodextrin polyether products. The lower molecular weight products may be separated by methods such as, for example, dialysis, or by stripping under vacuum. The higher molecular weight products of this invention are non-dialyzable. The cyclodextrin polyether product is separated as a viscous liquid by filtration. The viscous liquid product is characterized also by a light straw color.

The products which are obtained may have different molecular weights, depending on the total moles of the alkylene oxide which have been added to the hydroxyl groups on the anhydroglucose units in the cyclodextrin molecule. This extent of the addition can be characterized and identified in several ways. For example, the M. S. value of a given cyclodextrin polyether may be stated (molar substitution or moles of alkylene oxide per average anhydroglucose unit). The products of this invention have been indicated to have, generally, an M. S. value of from less than 1 to about 50 or more.

The molecular weight of an average anhydroglucose unit of a given polyether product can be determined from its hydroxyl number, which is determined experimentally in terms of the amount of potassium hydroxide required to back titrate after reacting the product with acetic anhydride. The amount of the potassium hydroxide used in the titration is conventionally expressed as mg. of KOH/gram of product. The relative proportions are than determined from the following formula:

$$\text{Hydroxyl No.} = \frac{1000 \times 56.1 \times F}{MW}$$

The numerical value of 56.1 represent the GMW of KOH, the value of 1000 is used for the meq. expression, and F is the functionality or the number of hydroxyl groups in the basic structure, that is, the average anhydroglucose unit, which is 3. MW refers to the molecular weight of the average substituted anhydroglucose unit after reaction with the alkylene oxide.

The molecular weight of an average substituted anhydroglucose unit of the cyclodextrin polyether product can then be determined from transposition of the values in the above formula. The difference between the molecular weight of an average substituted anhydroglucose unit, of the polyether product, determined from the formula, and the molecular weight of an unsubstituted anhydroglucose unit (162) represents the amount of alkylene oxide added, and from this amount, the moles of the alkylene oxide which were reacted per anhydroglucose unit, can be determined, and this is the M.S. value.

The following examples are presented to teach representative preparations of cyclodextrin polyethers, and such examples should not be construed as exclusive embodiments since they are intended only as illustrations. All parts and percentages are by weight unless specified otherwise.

EXAMPLE 1

Propylene oxide addition

Three hundred grams of a white, solid cyclodextrin material comprising about 90% of β-cyclodextrin, said material being 95% dry substance, was slurried in 300 grams of propylene oxide. A solution of 30 grams of methanol and 10 grams of potassium hydroxide, the methanol being a dispersing vehicle for the alkali, was added slowly to the mixture of reactants, and the reaction mixture was placed in an autoclave. The interior of the autoclave was purged for 10 minutes with nitrogen to remove the oxygen, and the autoclave temperature was raised to 120° C. at 55 p.s.i.g.

Following a 24 hour reaction period, additional catalyst solution was added together with another 300 grams of propylene oxide. The reaction was then conducted for an additional three hours at 105° C. At the conclusion of the 27 hour reaction, tartaric acid was added in an amount of 23 grams, which is the theoretical amount required to neutralize the basic catalyst. The product obtained was filtered through a 17 oz. twilly filter cloth, and the filtered product was collected as a viscous amber liquid. The product was then stripped under reduced pressure to remove any volatiles present. The collected product had a hydroxyl number of 336, a viscosity of 90,000 cps. at room temperature at 2 r.p.m., (Brookfield Viscometer, model LVF) and a pH of 8.1. After purification by dialysis, the product had a hydroxyl number of 253.

EXAMPLE 2

Propylene oxide addition

The general procedures of Example 1 were followed in reacting propylene oxide with 90% β-cyclodextrin, 95% dry substance. A smaller amount of the propylene oxide was added to the cyclodextrin, as indicated by the hydroxyl number of the collected product, which was 532. The product was a viscous liquid having an amber color, the viscosity being 40,000 cps. at 60° C. (Brookfield Viscometer, model LVF), at 2 r.p.m.

EXAMPLE 3

Ethylene oxide addition

The cyclodextrin starting material of Example 1 was dispersed in about 200 grams of ethylene oxide. A solution of 20 grams of methanol and about 7 grams of potassium hydroxide were added to the mixture, and the mixture was heated in an autoclave, following purging, at a temperature of about 70° C. The reaction was conducted until the pressure was substantially reduced which indicated that the ethylene oxide was substantially fully reacted with the cyclodextrin. The viscous, straw-colored liquid was filtered and stripped of any volatiles.

EXAMPLE 4

Addition of ethylene oxide and propylene oxide

Three hundred grams of the starting cyclodextrin of Example 1 was placed in an autoclave, to which was added 10 grams of potassium hydroxide, in 30 grams of methanol, and 300 grams of ethylene oxide. The reaction was conducted at about 92° C., and when the reaction was substantially completed, the temperature of the reaction within the autoclave was then maintained at about 105° C., and 300 grams of propylene oxide was continuously fed into the autoclave. The reaction was continued at pressures of about 55 p.s.i.g. until the pressure fell to a constant level below about 10 p.s.i. The product was filtered, and then was stripped under reduced pressure to remove any volatiles.

The reaction may be conducted as by the foregoing stepwise addition of the ethylene oxide and the propylene oxide, or, alternatively, the two alkylene oxides may be simultaneously charged into the reactor, and the reaction may be conducted at temperatures of about 120° C. for a sufficient time until the pressure within the autoclave falls to a constant low level which will indicate that substantially all the alkylene oxide has reacted with the cyclodextrin.

In accordance with the illustrative teachings of the foregoing examples, and by following the procedures described particularly in Example 1, other cyclodextrin polyethers may be prepared as taught by this disclosure. Polyether derivatives of different molecular weights are obtained by adding different amounts of, for example, ethylene oxide or propylene oxide. In a like manner, hydroxy substituted polyether derivatives are obtained by reacting hydroxyl substituted alkylene oxides such as glycidol (hydroxypropylene oxide) with the cyclodextrin. Similarly, an alkylene substituted alkylene oxide, such as, for example, butadiene monoxide, is reacted with the cyclodextrin to obtain the alkylene substituted polyether derivatives. Likewise, aromatic substituted polyether derivatives are obtained by reacting phenyl alkylene oxides such as styrene oxide with the cyclodextrin.

The cyclodextrin polyether products of this invention find useful application as intermediates for making desirable end products in accordance with the properties of the polyol moieties of the polyethers. For example, polyurethane resins may be obtained by reacting a diisocyanate such as toluene diisocyanate with the cyclodextrin polyether products. It is preferred to use polyether intermediates having a molar substitution of about 3 to about 15 to obtain rigid urethane foams, and a polyether intermediate having a molar substitution of about 40 to about 50 to obtain the flexible urethane foams.

EXAMPLE 5

Urethane foam formation

To a 100 gm. sample of the β-cyclodextrin polyether, prepared according to the procedures of Example 1, there was added 2 gm. of silicone fluid, 1 gm. triethylene diamine catalyst, 0.2 gm. dibutyl tin dilaurate, 20 gm. of Freon 11, and 56 gm. toluene diisocyanate. After a mixing time of 10 seconds, a cream time of 10 seconds, a rise time of 25 seconds, and a tack-free time of 15 seconds, a white, fine-celled urethane foam was obtained. The density was measured as 2.1 lb./cu. ft.

GENERAL

The torus molecule of the cyclodextrin polyethers of this invention encourages the use of these products as inclusion compounds. It will be appreciated that many of the products of this invention may be used as complexing agents or to form inclusion compounds and complexes with various chemicals in ways which are similar to those which are known relative to the cyclodextrins. For example, inclusion compounds may be formed with flavoring agents and the like. There are several utilities to which these inclusion characteristics may be extended such as, for example, altering solubilities of the complexed or included materials, partially resolving racemates, and permitting controlled release of desirable guest molecules such as flavoring agents or pharmaceutical agents. Various other uses will occur to practitioners skilled in the art.

The products of this invention are also useful because of their inherent properties. For example, the products may be used as surfactants to permit wetting of surfaces, to enhance penetration of various materials in a variety of industrial applications, or in any of the other general areas where the properties of surfactants are desirable. In another application, the products of this invention may be used to form protective colloids as in the coating of paper with clay compositions.

While the invention is primarily concerned with the production of polyethers, those skilled in the art will readily understand that the hydroxyl groups may be reacted with other substituents that are compatible with the oxide addition, either before or after the oxide addition.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention.

We claim:

1. A cyclodextrin polyether represented by the following formula:

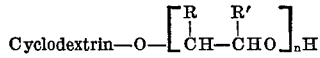

where R and R' are selected from the class consisting of hydrogen, lower alkyl, lower hydroxy substituted alkyl, and monocyclic aryl, and where $n$ represents a molar substitution per anhydroglucose unit which is a number up to about 50.

2. A cyclodextrin polyether as in claim 1, further characterized in that R and R' are both hydrogen.

3. A cyclodextrin polyether as in claim 1, further characterized in that R' is CH$_3$ and R is hydrogen.

4. A cyclodextrin polyether comprising a plurality of cyclic anhydroglucose units, said plurality being predominantly 6 through 8, and the average anhydroglucose unit having lower alkylene oxide addition at the available hydroxy groups so that the molar substitution of said lower alkylene oxide per average anhydroglucose unit is from a small but detectable amount, less than 1, up to about 50.

5. A cyclodextrin polyether as in claim 4 further characterized in that the lower alkylene oxide addition is ethylene oxide addition.

6. A cyclodextrin polyether as in claim 4 further characterized in that the plurality of anhydroglucose units is 6.

7. A cyclodextrin polyether as in claim 4 further characterized in that the lower alkylene oxide addition is propylene oxide addition.

8. A cyclodextrin polyether as in claim 4 further characterized in that the plurality of anhydroglucose units is 7.

9. A cyclodextrin polyether as in claim 4 further characterized in that the plurality of anhydroglucose units is 8.

10. A cyclodextrin polyether as in claim 4 further characterized in that the alkylene oxide addition is a hydroxy substituted lower alkylene oxide addition.

11. A cyclodextrin polyether as in claim 4 further characterized in that the alkylene oxide addition is a halogen substituted lower alkylene oxide addition.

12. A cyclodextrin polyether as in claim 4 further characterized in that the alkylene oxide addition is a phenyl substituted lower alkylene oxide addition.

13. A cyclodextrin polyether as in claim 5 further characterized in that the molar substitution of the ethylene oxide is about 3 to about 15.

14. A cyclodextrin polyether as in claim 7 further characterized in that the molar substitution of the propylene oxide addition is about 40 to about 50.

References Cited

UNITED STATES PATENTS

| | | | |
|---|---|---|---|
| 2,518,135 | 8/1950 | Gaver. | |
| 2,761,247 | 9/1956 | Meadows. | |
| 2,900,268 | 8/1959 | Rankin et al. | 260—209 |
| 2,945,025 | 7/1960 | De Groote et al. | 260—209 |
| 2,996,551 | 8/1961 | De Groote et al. | 260—209 |
| 3,042,666 | 7/1962 | Gentles | 260—210 |

ELBERT ROBERTS, Primary Examiner

JOHNNIE R. BROWN, Assistant Examiner

U.S. Cl. X.R.

99—140; 117—156; 252—351; 260—2